United States Patent
Kanai (10) Patent No.: US 7,773,351 B2
(45) Date of Patent: Aug. 10, 2010

(54) MOTOR CONTROL MICROCOMPUTER AND CONTROL METHOD FOR THE SAME

(75) Inventor: Tomoaki Kanai, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 262 days.

(21) Appl. No.: 12/153,589

(22) Filed: May 21, 2008

(65) Prior Publication Data

US 2008/0291588 A1 Nov. 27, 2008

(30) Foreign Application Priority Data

May 22, 2007 (JP) ............................. 2007-135453

(51) Int. Cl.
H02H 7/08 (2006.01)

(52) U.S. Cl. .......................... 361/23; 361/24; 318/434; 318/400.04; 363/40; 363/41

(58) Field of Classification Search ............... 318/254.2, 318/400.04, 434, 716, 721, 807; 361/23, 361/24; 363/40, 41
See application file for complete search history.

(56) References Cited

U.S. PATENT DOCUMENTS

| | | | | |
|---|---|---|---|---|
| 6,153,993 | A * | 11/2000 | Oomura et al. | 318/434 |
| 6,700,343 | B2 * | 3/2004 | Masaki et al. | 318/434 |
| 6,844,697 | B2 * | 1/2005 | Masaki et al. | 318/721 |
| 6,954,096 | B2 * | 10/2005 | Ito et al. | 327/172 |
| 7,049,778 | B2 * | 5/2006 | Katanaya | 318/400.04 |
| 7,224,354 | B2 * | 5/2007 | Ko et al. | 345/211 |
| 7,312,969 | B2 * | 12/2007 | Matsumoto et al. | 361/93.9 |
| 7,339,334 | B2 * | 3/2008 | Ling et al. | 318/254.2 |
| 7,456,603 | B2 * | 11/2008 | Kanekawa et al. | 318/807 |
| 2001/0004321 | A1 * | 6/2001 | Nakano | 363/40 |
| 2003/0214266 | A1 * | 11/2003 | Cheng et al. | 318/716 |
| 2004/0052096 | A1 * | 3/2004 | Fu | 363/41 |
| 2004/0114400 | A1 * | 6/2004 | Shinba | 363/56.02 |
| 2004/0119707 | A1 * | 6/2004 | Ko et al. | 345/204 |
| 2004/0150431 | A1 * | 8/2004 | Ito et al. | 327/91 |
| 2005/0057200 | A1 * | 3/2005 | Akiyama | 318/66 |
| 2005/0162142 | A1 * | 7/2005 | Kernahan et al. | 323/283 |
| 2006/0197508 | A1 * | 9/2006 | Matsumoto et al. | 323/201 |
| 2007/0029955 | A1 * | 2/2007 | Kanekawa et al. | 318/144 |
| 2008/0055799 | A1 * | 3/2008 | Serizawa et al. | 361/24 |
| 2009/0115364 | A1 * | 5/2009 | Harada | 318/434 |
| 2009/0167274 | A1 * | 7/2009 | Chien et al. | 323/285 |
| 2009/0184701 | A1 * | 7/2009 | Yen | 323/283 |

FOREIGN PATENT DOCUMENTS

JP 2000-175481 6/2000

* cited by examiner

*Primary Examiner*—Paul Ip
(74) *Attorney, Agent, or Firm*—McGinn IP Law Group, PLLC (57) ABSTRACT

An object of the present invention is to improve safety of a motor by instantaneously detecting the abnormality of a PWM signal. To achieve the object, provided is a motor control microcomputer for outputting PWM signals to a motor drive circuit driving a motor, which includes an abnormal signal detection circuit and a PWM signal stop circuit. The abnormal signal detection circuit receives inputs of positive-phase and negative-phase signals of the PWM signals, detects that both of the positive-phase and negative-phase signals are at the H level, and then outputs detection signals. The PWM signal stop circuit receives the detection signals from the abnormal signal detection circuit, and stops the outputs of the PWM signals.

12 Claims, 6 Drawing Sheets

MOTOR CONTROL MICROCOMPUTER AND CONTROL METHOD FOR THE SAME

BACKGROUND OF THE INVENTION

1. Field of the Invention

The present invention relates to a motor control microcomputer.

2. Description of Related Art

The pulse width modulation (PWM) drive system has conventionally been widely used in the motor control microcomputer which controls the rotation of a motor. In this PWM drive system, current to a motor coil is controlled by turning on and off a switching element included in a motor drive circuit. In the motor control microcomputer using the PWM drive system, each period between timings to turn a switching element on and off is set to be the same, and power supply to a motor coil is controlled by changing the pulse width during which the switching element is turned on, relative to the period. In the motor control microcomputer, an abnormal rotation of a motor may cause a large current to flow to the switching element, thus thermally destructing the switching element. To avoid such problem, there is a known technique for detecting such an abnormal operation and stopping power supplied to the motor in the case of the abnormal operation.

Japanese Patent Application Publication No. 2000-175481 describes such technique. In this technique, first, PWM signals, which control the rotational speed of a brushless motor and a switching element, are monitored. When the rotational speed is lower than a fixed speed and when the frequency of the PWM signal is more than a fixed frequency, it is judged that a rotational abnormality is occurring. Then, the rotation of the motor is stopped.

However, the motor control microcomputer described in Japanese Patent Application Publication No. 2000-175481 is not configured to instantaneously detect a status in which both of a positive-phase signal and a negative-phase signal cause switching elements configuring an inverter to be driven at the same time. Therefore, the motor control microcomputer described in Japanese Patent Application Publication No. 2000-175481 requires a longer delay time to detect abnormality after the occurrence of the abnormality, so that the risks of the thermal destruction of a switching element, and of the damage to a motor in some cases, increase.

SUMMARY

The present invention seeks to solve one or more of the above problems, or to improve upon those problems at least in part.

In one embodiment, a motor control microcomputer includes a PWM signal output circuit, an abnormal signal detection circuit receiving positive-phase and negative-phase signals of the PWM signal and outputting a detection signal upon the positive-phase and negative-phase signals being a prescribed logical value, and a PWM signal stop circuit stopping the PWM signal output circuit from outputting the PWM signal in accordance with the detection signal.

As described above, upon detection of an abnormality that both of positive-phase and negative-phase signals of a PWM signal are the prescribed logical value, the output of the PWM signal is stopped when such an abnormality occurred. Accordingly, an abnormality can be instantaneously detected with a simple circuit configuration.

A motor control microcomputer according to the present invention can improve safety by instantaneously detecting the abnormality of a PWM signal.

BRIEF DESCRIPTION OF THE DRAWINGS

The above and other objects, advantages and features of the present invention will be more apparent from following description of certain preferred embodiments taken in conjunction with the accompanying drawings, in which.

DETAILED DESCRIPTION OF THE PREFERRED EMBODIMENTS

Descriptions will hereinafter be given of embodiments of the present invention with reference to the attached drawings.

First Embodiment

Figure 1:
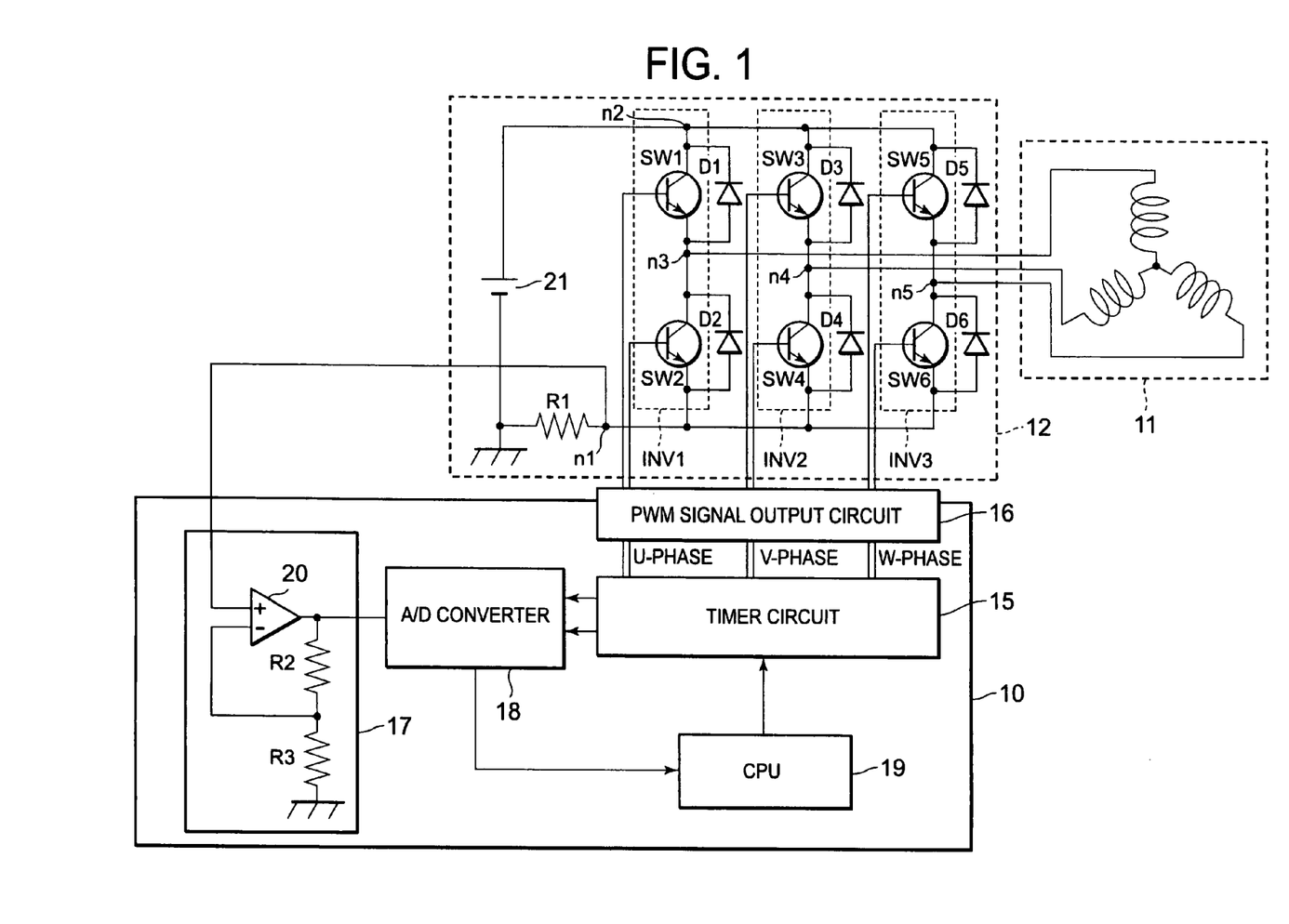
FIG. 1 is a block diagram showing a whole configuration example of a motor control microcomputer according to a first embodiment of the present invention.

FIG. 1 is a block diagram showing a whole configuration of a motor control microcomputer 10 according to the present invention. The motor control microcomputer 10 is connected to a motor drive circuit 12 driving a motor coil 11, and controls the rotation of a motor by controlling a PWM signal outputted to the motor drive circuit 12. The motor drive circuit 12 has a plurality of switching elements SW1 to SW6, and adjusts power supplied to the motor by turning the switching elements SW1 to SW6 on and off in accordance with a PWM signal inputted from the motor control microcomputer 10. FIG. 1 shows only the motor coil 11 among motors targeted to be controlled. Note that as an example, the number of phases of a coil of the motor coil and the number of phases of an inverter INV of the motor drive circuit 12 are three, respectively, in the following descriptions of the embodiments, but the numbers of phases of the coil and of the inverter are not limited to three.

The motor control microcomputer 10 outputs a three-phase PWM signal generated by a timer circuit 15 to the motor drive circuit 12 through a PWM signal output circuit 16. A feature of the present invention is a configuration of the PWM signal output circuit 16 as will be described later. A PWM signal outputted from the PWM signal output circuit 16 performs the on/off control on each of the switching elements SW1 to SW6. The switching elements SW1 to SW6 are placed between a power supply 21 and the motor coil 11, and adjust power supplied from the power supply 21 to the motor coil 11.

The motor drive circuit 12 outputs the voltage of a node n1 as an internal signal to the motor control microcomputer 10. The motor control microcomputer 10 monitors this voltage of the node n1, and performs the feedback control of a PWM signal. The voltage of the node n1 is measured by an A/D converter 18 in the motor control microcomputer 10. A CPU 19 controls the timer circuit 15 in accordance with the measurement result.

The motor drive circuit 12 is configured of the switching elements SW1 to SW6, diodes D1 to D6, a resistor R1, and the power supply 21. The motor drive circuit 12 has a three-phase inverter INV. The three-phase inverter is connected to a three-phase coil configured as the motor coil 11 in order to supply power.

The switching elements SW1 and SW2 configure an inverter INV1, the drive of which is controlled by a U-phase PWM signal. The switching element SW1 is configured of an n-type transistor which is connected to a node n2 through a source thereof and to a node n3 through a drain thereof, and in which a positive-phase signal U of a U phase is inputted to a gate thereof. The switching element SW2 is configured of an n-type transistor which is connected to the node n3 through a source thereof and to the node n1 through a drain thereof, and in which a negative-phase signal /U of the U phase is inputted to a gate thereof.

The diode D1 is connected between the nodes n2 and n3. The diode D1 is connected to the node n2 through an anode thereof and to the node n2 through a cathode thereof. Similarly, the diode D2 is connected between the nodes n3 and n1. The diode D2 is connected to the node n1 through an anode thereof and to the node n3 through a cathode thereof. The diodes D1 and D2 are provided so that a current would be smoothed when the switching elements SW1 and SW2 are switched at high speed. Additionally, when the switching elements SW1 and SW2 are switched from on to off, induced electromotive force is generated in the motor coil, so that a high voltage, what is called a surge voltage, is generated in the motor. The diodes D1 and D2 also have the function of reducing the surge voltage to be inversely applied to the switching elements SW1 and SW2 and protecting the switching elements SW1 and SW2.

Similarly, the switching elements SW3 and SW4 configure an inverter INV2, the drive of which is controlled by a V-phase PWM signal. The switching element SW3 is configured of an n-type transistor which is connected to the node n2 through a source thereof and to the node n4 through a drain thereof, and in which a positive-phase signal V of a V phase is inputted to a gate thereof. The switching element SW4 is configured of an n-type transistor which is connected to the node n4 through a source thereof and to a node n1 through a drain thereof, and in which a negative-phase signal /V of the V phase is inputted to a gate thereof. The diode D3 is connected to the node n4 through an anode thereof and to the node n2 through a cathode thereof. The diode D4 is connected to the node n1 through an anode thereof and to the node n4 to a cathode thereof.

The switching elements SW5 and SW6 configure an inverter INV3, the drive of which is controlled by a W-phase PWM signal. The switching element SW5 is configured of an n-type transistor which is connected to the node n2 through a source thereof and to a node n5 through a drain thereof, and in which a positive-phase signal W of a W phase is inputted to a gate thereof. The switching element SW6 is configured of an n-type transistor which is connected to the node n5 through a source thereof and to the node n2 through a drain thereof, and in which a negative-phase signal /W of the W phase is inputted to a gate thereof. The diode D5 is connected to the node n5 through an anode thereof and to the node n2 through a cathode thereof. The diode D6 is connected to the node n1 through an anode thereof and to the node n5 through a cathode thereof.

Each of the nodes n3, n4 and n5 respectively being the output of the inverters INV1 to INV3 is connected to the corresponding one of the three-phase coil configured as the motor coil 11. The rotation of the motor coil 11 is controlled in accordance with the power supplied from the nodes n1 to n3. The resistor R1 is connected between the node n1 and a ground. The motor drive circuit 12 outputs the voltage of the node n1 to the motor control microcomputer 10. Accordingly, the internal signal of the motor drive circuit 12 is monitored by the motor control microcomputer 10.

The motor control microcomputer 10 is configured of the timer circuit 15, the PWM signal output circuit 16, a comparator circuit 17, the A/D converter 18, and the CPU 19. The timer circuit 15 generates a three-phase PWM signal composed of the positive-phase signals of the U, V, and W phases and the negative-phase signals of the /U, /V, and /W phases, and outputs the three-phase PWM signal to the PWM signal output circuit 16. The three-phase PWM signal is outputted to each of the switching elements SW1 to SW6 of the motor drive circuit 12, and drives the switching elements SW1 to SW6.

Figure 2:
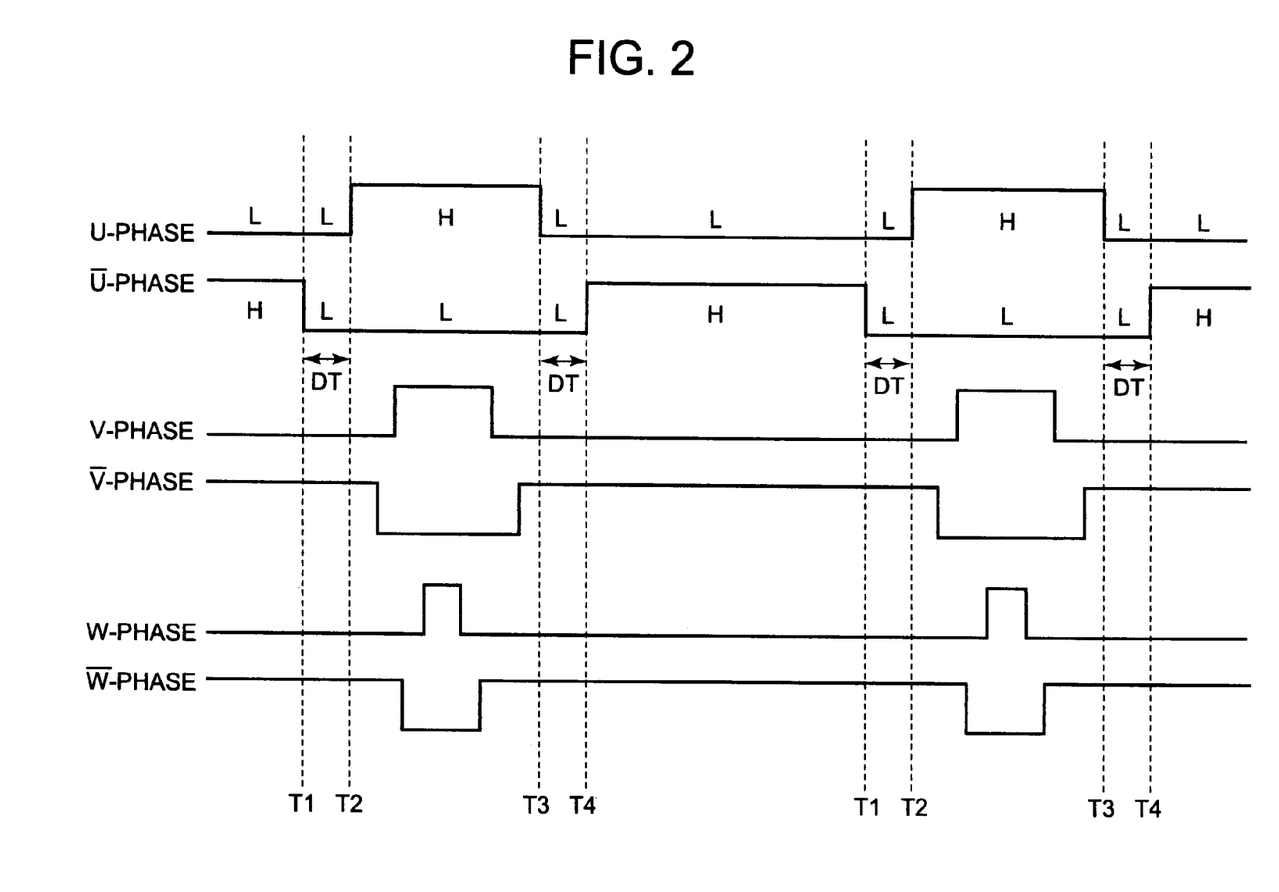
FIG. 2 is a timing chart of a three-phase PWM signal generated by a timer circuit.

FIG. 2 is a timing chart of the three-phase PWM signal generated by the timer circuit 15. All of the U-, V-, and W-phase PWM signals have the same period from T1 to the next T1. A duty ratio indicating an on-state pulse width in the period is changed so that power supplied to the motor is adjusted. Here, when both of the positive and negative signals become the H level, a pair of switching elements SW configuring inverter INV is turned on at the same time. Consequently, pass-through currents flow to the switching elements SW configuring the inverter INV. These pass-through currents may lead to the destruction of the switching elements. For this reason, when the positive signal is switched from the L level to the H level, or from the H level to the L level, the timer circuit 15 sets dead times DT during which both of the positive- and negative-phase signals are set to the L level, in order not to produce a time during which both of the positive- and negative-phase signals become the H level when the voltage level is switched.

Descriptions will be given of the positive-phase signal U and negative-phase signal /U of the U phase. The positive-phase signal U changes from the H level to the L level in T2, and from the H level to the L level in T3. On the other hand, the negative-phase signal /U of the U phase changes from the H level to the L level in T1, and from the L level to the H level in T4. In other words, the periods of T1 to T2 and T3 to T4 are the dead times DT during which both of the positive-phase signal U and negative-phase signal /U of the U phase are set to the L level. Similarly, the V- and W-phase PWM signals too have the dead times DT during which the negative-phase signals are set to the L level when the positive-phase signals are switched from the L level to the H level or from the H level to the L level. In this manner, the positive- and negative-phase signals of the PWM signal may become the L level at the same time, but do not become the H level at the same time.

The PWM signal output circuit 16 is configured to detect a status of an abnormal PWM signal, in which both of the positive- and negative-phase signals of the PWM signal are at the H level. The PWM signal output circuit 16 is configured to stop the output of PWM signals and power supply to the motor upon the detection of the status that both of the positive- and negative-phase signals in any phase have become the H level.

The comparator circuit 17 is configured of a comparator 20 and resistors R2 and R3. The voltage of the node n1 is inputted to one side of the comparator 20 and a reference voltage Vref determined by the resistors R2 and R3 is inputted to the other side thereof. The comparator 20 is configured to output the H level when the voltage of the node n1 is greater than the reference voltage Vref and output the L level when the voltage of the node n1 is smaller than the reference voltage Vref. The resistors R2 and R3 are serially connected between the output terminal and ground of the comparator 20. The voltage of a node n6 between the resistors R2 and R3 is outputted to the comparator 20 as the reference voltage Vref.

The A/D converter 18 is configured to receive the output of the comparator 20, to convert the output into a digital signal, and to output the converted signal to the CPU 19. The CPU 19 adjusts a control signal outputted to the timer circuit 15 on the basis of the digital signal inputted from the A/D converter 18, and performs the feedback control on the three-phase PWM signal.

Figure 3:
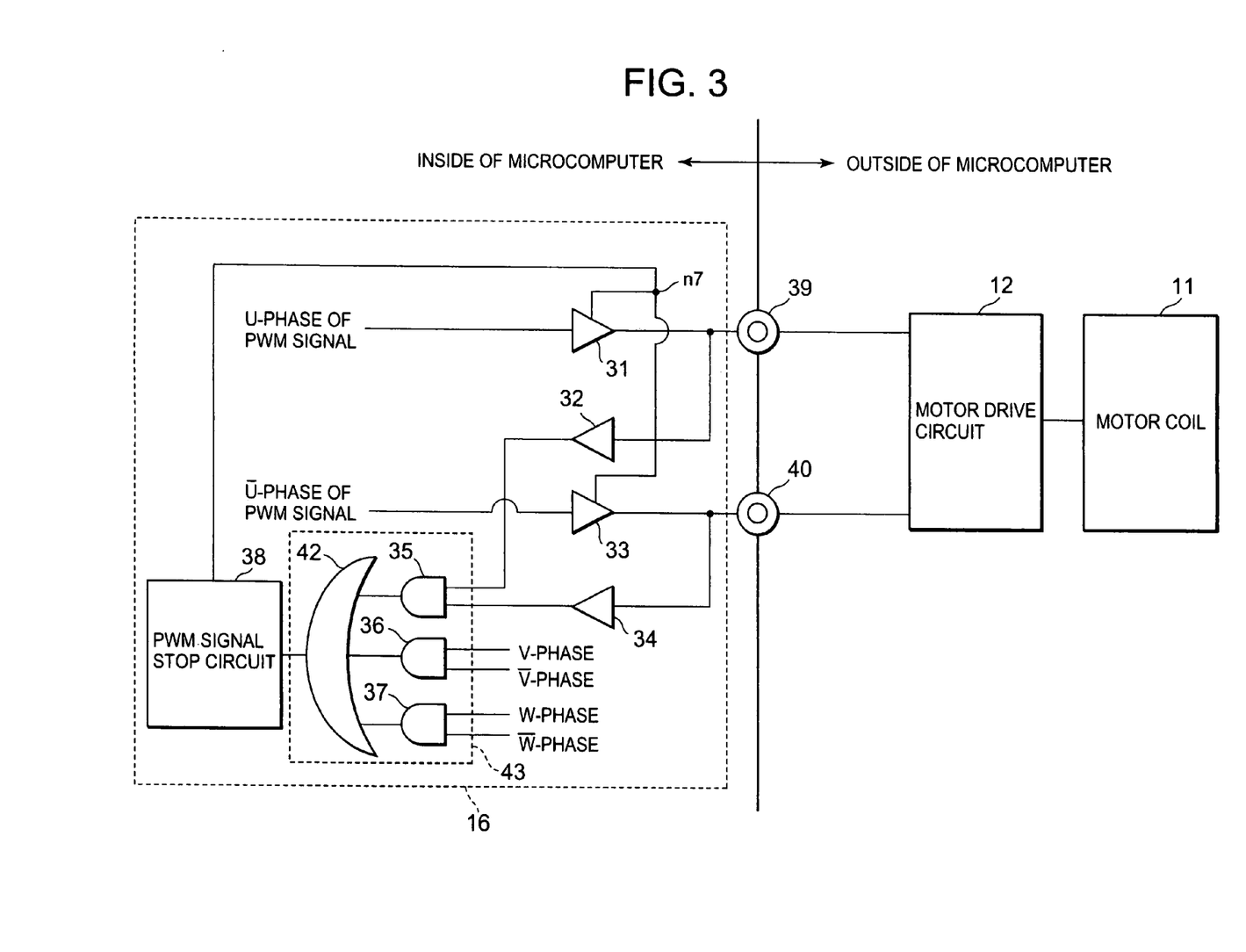
FIG. 3 is a block diagram showing a configuration example of a PWM signal output circuit.

FIG. 3 is a block diagram showing a configuration example of the PWM signal output circuit 16. In the timing chart shown in FIG. 2, the positive- and negative-phase signals may become the L level at the same time, but does not become the H level at the same time. This is because if the positive- and negative-phase signals become the H level at the same time, a pair of switching elements SW configuring the inverter INV is turned on at the same time, and pass-through currents flow to the inverter INV, resulting in damage to the switching elements SW. Hence, the PWM signal output circuit 16 is configured to detect the abnormal status that the positive- and negative-phase signals become the H level at the same time.

As shown in FIG. 3, the positive-phase signal U of the U phase, which is generated by the above-mentioned timer circuit 15, is outputted to an output terminal 39 through an output buffer 31. Similarly, the negative-phase signal /U of the U phase is outputted to an output terminal 40 through an output buffer 33. Centering the output terminals 39 and 40, the left side of FIG. 3 shows the inside of the motor control microcomputer 10 and the right side of FIG. 3 shows the outside of the motor control microcomputer 10. FIG. 3 shows an output unit of the U phase in detail. The other phases of V and W too have similar configurations to the U phase. The output terminals 39 and 40 are connected to the motor drive circuit 12. The power of the output buffers 31 and 33 which output the U-phase PWM signals are connected to a node 7. In other words, the positive-phase signal U and the negative-phase signal /U are controlled by the voltage of the node n7 over whether to be outputted to the motor drive circuit 12.

The PWM signal output circuit 16 is configured of the output buffers 31 and 33, abnormality detection buffers 32 and 34, an abnormal signal detection circuit 43, and a PWM signal stop circuit 38. The present embodiment is characterized by including: the abnormal signal detection circuit 43 which detects the positive- and negative-phase signals becoming the H level at the same time; and the PWM signal stop circuit 38 which stops the PWM signal when the abnormality of the PWM signal has been detected by the abnormal signal detection circuit 43. The abnormality detection buffer 32 provided on the side of the U-phase positive-phase signal U is configured to receive input of a voltage between the output buffer 31 and the output terminal 39, that is, a voltage on the output side of the output buffer 31 which outputs the positive-phase signal U of the U phase, and then to output the voltage to the abnormal signal detection circuit 43. The abnormality detection buffer 34 provided on the side of the U-phase negative-phase signal /U is configured to receive input of a voltage between the output buffer 33 and the output terminal 40, that is, a voltage on the output side of the output buffer 33 which outputs the negative-phase signal /U of the U phase, and then to output the voltage to the abnormal signal detection circuit 43.

The abnormal signal detection circuit 43 is configured of AND circuits 35 to 37 and an OR circuit 42. The positive- and negative-phase signals of the U-, V-, and W-phase PWM signals are inputted to the AND circuits 35 to 37, respectively. Here, descriptions will be given taking an example of the AND circuit 35 provided for the U phase. The AND circuit 35 receive input of the positive-phase signal U of the U phase from the abnormality detection buffer 32 at one side and receives input of the negative-phase signal /U of the U phase from the abnormality detection buffer 34 at the other side. Then, the AND circuit 35 outputs the AND to the OR circuit 42. In other words, the AND circuit 35 detects that the positive-phase signal U and negative-phase signal /U of the U phase become the H level at the same time, and outputs the H level as a detection signal to the OR circuit 42. Similarly, the AND circuit 36 receives input of positive-phase signal V and negative-phase signal /V of the V phase from the unillustrated buffer, and then outputs the AND to the OR circuit 42. Likewise, the AND circuit 37 receives input of the positive-phase signal W and negative-phase signal /W of the W phase, and then outputs the AND to the OR circuit 42. In other words, the AND circuit 36 detects that the positive-phase signal V and negative-phase signal /V of the V phase become the H level at the same time, and outputs the H level as a detection signal to the OR circuit 42, and the AND circuit 37 detects that the positive-phase signal W and negative-phase signal /W of the W phase become the H level at the same time, and outputs the H level as a detection signal to the OR circuit 42. In this manner, if an abnormality occurs in any of U-, V-, and W-phase PWM signals, the H level is inputted from at least one of the AND circuits 35 to 37 to the OR circuit 42.

The OR circuit 42 outputs the OR of the detection signals of the AND circuits 35 to 37 to the PWM signal stop circuit 38. In other words, when the abnormality that the positive- and negative-phase signals become the H level at the same time is detected in at least one of the U, V, and W phases, the OR circuit 42 outputs a detections signal indicating the abnormality to the PWM signal stop circuit 38. When receiving, from the OR circuit 42, input of the detection signal indicating the abnormality of the PWM signal, the PWM signal stop circuit 38 stops the abnormal output by turning the output terminals 39 and 40 of PWM signals into high impedance. In other words, the PWM signal stop circuit 38 turns off the power supplied from the node n7 to the output buffers 31 and 33 and stops the outputs of the output buffers 31 and 33. At the same time, the PWM signal stop circuit 38 turns off the power of the unillustrated V- and W-phase output buffers, so that the PWM signals of all the U, V and W phases are stopped. As a result, the PWM signal outputted from the motor control microcomputer 10 to the motor drive circuit 12 is stopped, and the power supplied to the motor coil 11 is accordingly stopped. In this manner, the PWM signal output circuit 38 can stop the rotation of the motor when the abnormality occurs in the PWM signal.

Next, descriptions will be given of the operations of the motor control microcomputer 10 configured in the above manner with reference to FIG. 3. When both of the positive-phase signal U and negative-phase signal /U of the U phase become the H level due to a malfunction of the motor control microcomputer 10, a short circuit of an external circuit connected to the outside of the output terminals 39 and 40, and the like, the H level is inputted to the AND circuit 35 at both inputs. The AND circuit 35 outputs a detection signal to inform the abnormality of the U phase to the OR circuit 42. When receiving, from the AND circuit 35, input of the detection signal to inform the abnormality of the U-phase PWM signal, the OR circuit 42 outputs, to the PWM signal stop circuit 38, the detection signal to inform that the abnormality has occurred in any of the PWM signals. When receiving input of the detection signal from the OR circuit 42, the PWM signal stop circuit 38 turns off the power of the output buffers 31 and 33 and stops the output of the U-phase PWM signal. At the same time, the PWM signal stop circuit 38 turns off the power of the output buffers of the V- and W-phases so that the outputs of the PWM signals of all the U, V and W phases are stopped. Consequently, the PWM signals outputted to the motor drive circuit 12 are stopped, and the power supplied to the motor coil 11 is stopped. The motor coil 11 stops its rotation since the supplied powers have been stopped.

The motor control microcomputer 10 configured in the above manner is provided with the abnormal signal detection circuit 43 which detects the status that the positive- and negative-phase signals have become the H level at the same time. Therefore, the motor control microcomputer 10 can instantaneously stops the rotation of the motor by stopping the outputs of the PWM signals with the PWM signal stop circuit 38, when the abnormality of the PWM signal is detected by the abnormal signal detection circuit 43. In the first embodiment, the delay time necessary for abnormality detection is just a response time of the abnormality detection buffers 32 and 34. Additionally, since the abnormal signal detection circuit 43 is simply configured of the AND circuits 35 to 37 and the OR circuit 42, it is possible to simplify the circuit configuration of the detection circuit provided inside and outside the conventional motor control microcomputer. Accordingly, a complicated circuit configuration provided for the conventional abnormality detection is not required, so that it is possible to dramatically reduce a detection time required for the conventional abnormality detection. In this manner, the motor control microcomputer 10 according to the first embodiment can dramatically reduce the delay time of abnormality detection with the simple configuration. The motor control microcomputer 10 according to the first embodiment can avoid risks such as the thermal destruction of the switching element and damage to the motor and can improve the safety of the motor by instantaneously detecting the abnormalities of the PWM signals.

Second Embodiment

Figure 4:
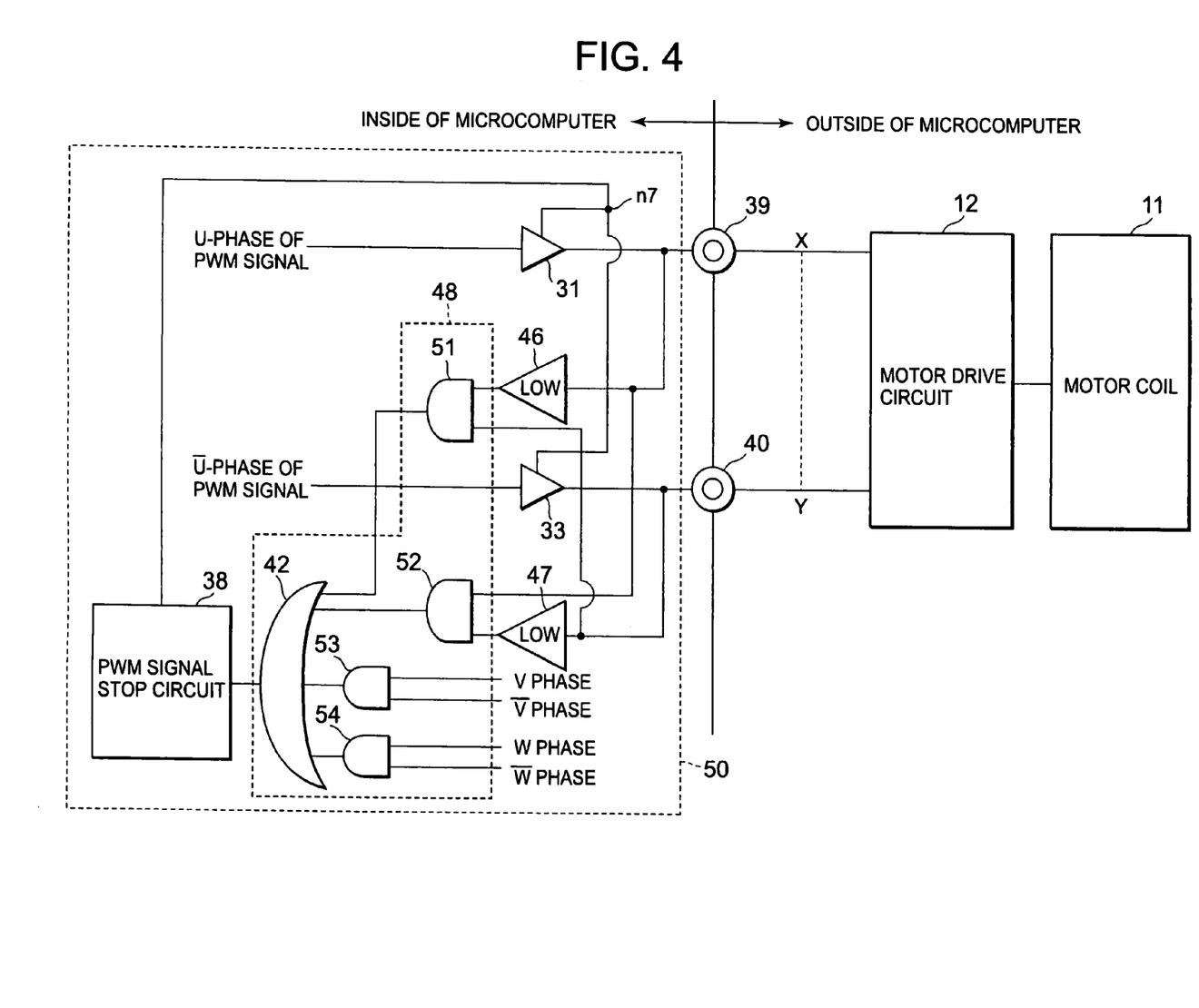
FIG. 4 is a block diagram showing a configuration example of a PWM signal output circuit according to a second embodiment of the present invention.

FIG. 4 is a view showing a configuration example of a PWM signal output circuit 50 according to a second embodiment of the present invention. Note that since the whole configuration is approximately the same as the one according to the first embodiment shown in FIG. 1, descriptions thereof will be omitted. Descriptions will hereinafter be omitted of configurations which are approximately the same as those in the first embodiment while attaching the same numerical symbols to the configurations. FIG. 4 corresponds to FIG. 3 in the first embodiment. The second embodiment is characterized in that abnormality detection buffers (signal level detection circuits) 46 and 47 are configured as buffers having a low threshold value.

As shown in FIG. 4, the PWM signal output circuit 50 is configured of the abnormality detection buffers 46 and 47 and an abnormal signal detection circuit 48. The abnormal signal detection circuit 48 has an AND circuit 51 and an AND circuit 52. The AND circuit 51 detects an abnormality of the positive-phase signal U of the U phase, whereas the AND circuit 52 detects an abnormality of the negative-phase signal /U of the U phase. Although the abnormal signal detection circuits 48 is provided with the AND circuits for detecting the abnormalities of the positive- and negative-phase signals of the V and W phases as in the U phase, these illustrations are omitted by showing one AND circuit 53 and one AND circuit 54, for the respective V and W phases in the drawing.

The abnormality detection buffers 46 and 47 are buffers having the low threshold value to output the H level when receiving input of a voltage, for example, equal to or more than a quarter of the power source. The abnormality detection buffer 46 receives input of a voltage between the output buffer 31 and the output terminal 39, that is, a voltage on the output side of the output buffer 31 which outputs the positive-phase signal U of the U phase. The abnormality detection buffer 46 outputs the H level to the AND circuit 51 when the voltage exceeds the threshold value. The AND circuit 51 receives, at one side, the output of the abnormality detection buffer 46 on the positive-phase signal side, and at the other side, receives input of the voltage on the output side of the output buffer 33 which outputs the negative-phase signal /U. The AND circuit 51 then outputs the AND to the OR circuit 42.

The abnormality detection buffer 47 receives input of a voltage between the output buffer 33 and the output terminal 40, that is, a voltage on the output side of the output buffer 33 which outputs the negative-phase signal /U, and outputs the H level to the AND circuit 52 when the voltage exceeds the threshold value. The AND circuit 52 receives, at one side, a voltage between the output buffer 31 and the output terminal 39, that is, a voltage on the output side of the output buffer 31 which outputs the positive-phase signal U, and at the other side, receives the output of the abnormality detection buffer 47. The AND circuit 52 then outputs the AND to the OR circuit 42. Note that it is assumed that the V and W phases too are provided with their respective abnormality detection buffers having the low threshold value and their respective AND circuits to which the outputs of the abnormality detection buffers are inputted.

Next, descriptions will be given of the operations of the PWM signal output circuit 50 configured in the above manner. For example, assume that a short circuit occurred at X between the output terminal 39 and the motor drive circuit 12 and Y between the output terminal 40 and the motor drive circuit 12, when the positive-phase signal U of the U phase is to be at the H level and the negative-phase signal /U of the U phase is to be at the L level. Such a short circuit increases the negative-phase signal /U at the L level to the H level. The abnormality detection buffer 47 detects such a subtle increase in the voltage of the negative-phase signal /U and outputs the H level to the AND circuit 52. The AND circuit 52 receives the H level from both the positive-phase signal U and the output of the abnormality detection buffer 47. The AND circuit 52 outputs the H level to the OR circuit 42, accordingly. Upon reception of input of the H level from the AND circuit 52, the OR circuit 42 outputs, to the PWM signal stop circuit 38, the detection signal indicating that the abnormality has occurred in the PWM signal. The PWM signal stop circuit 38 turns off the powers of the output buffers 31 and 32 to stop the output of the U-phase PWM signal. Note that the powers of the output buffers are similarly stopped to stop the PWM signals for the V and W phases, too.

In this manner, in the second embodiment, it is possible to detect, as an abnormality, even a case where even though the positive- and negative-phase signals do not become the H level at the same time, one is at the H level while the other increases to the H level, by using the abnormality detection buffers 46 and 47 having the low threshold value. In other words, the PWM signal output circuit 50 according to the second embodiment can improve the detection sensitivity to detect the abnormalities of the PWM signals.

Third Embodiment

Figure 5:
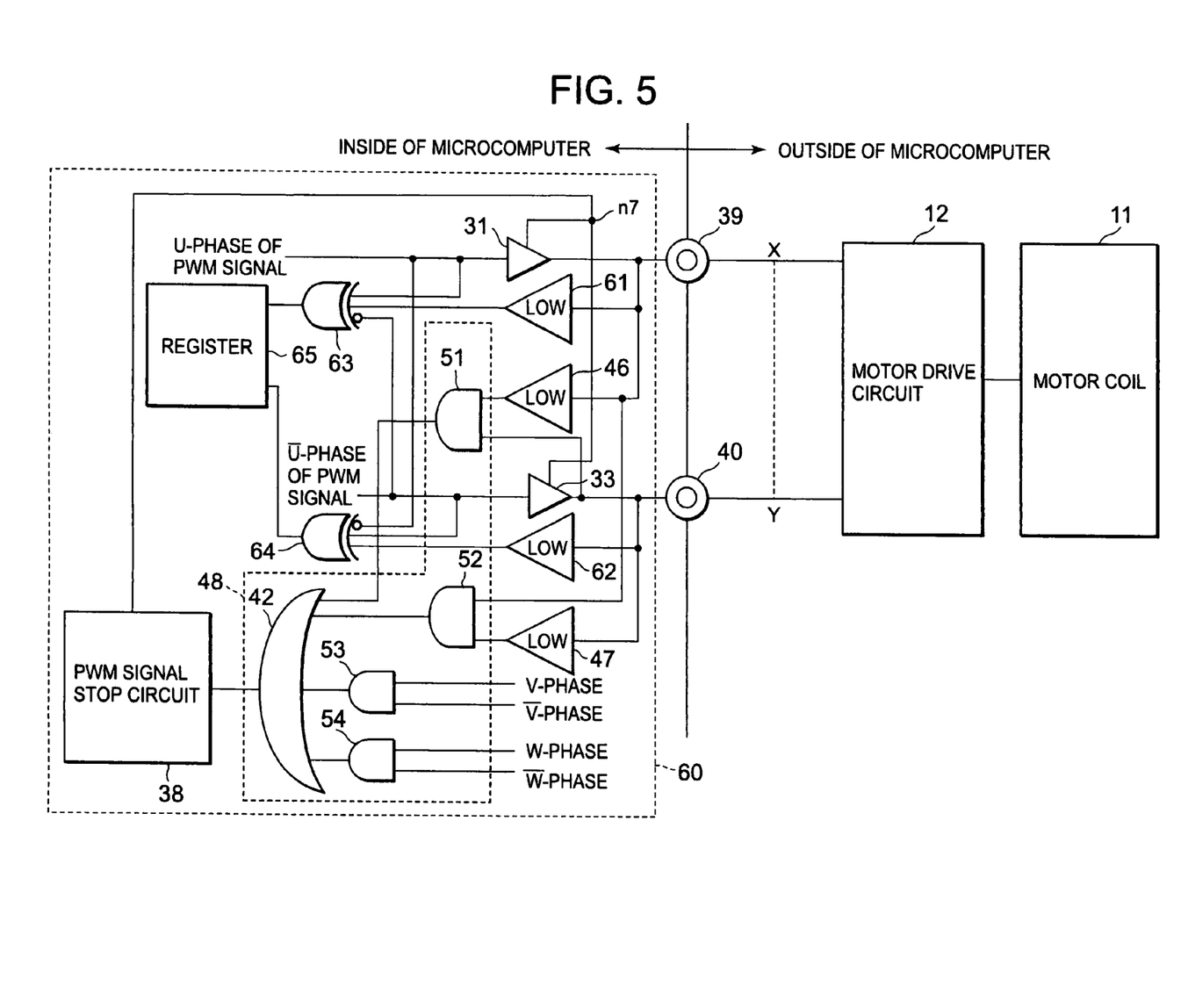
FIG. 5 is a view showing a configuration example of a PWM signal output circuit according to a third embodiment of the present invention.

FIG. 5 is a view showing a configuration example of a PWM signal output circuit 60 according to a third embodiment of the present invention. Note that since the whole configuration is approximately the same as the one according to the first embodiment shown in FIG. 1, the descriptions thereof will be omitted. FIG. 5 corresponds to FIG. 3 in the first embodiment. The third embodiment is characterized by providing a function of judging whether a cause of a PWM signal abnormality lies inside or outside the motor control microcomputer 10 in addition to the configuration of the second embodiment.

As shown in FIG. 5, the PWM signal output circuit 60 is provided with buffers 61 and 62, EXOR circuits 63 and 64, and a resistor 65 in addition to the second embodiment. Note that since the other circuit configurations are approximately the same as those in the second embodiment, the descriptions thereof will be omitted of the same configurations while attaching the same numerical symbols. The buffers 61 and 62 are configured as buffers having a low threshold value of an approximately quarter of the power source. The buffer 61 receives an output signal of the output buffer 31 of the positive-phase signal U, and outputs the H level to the EXOR circuit 63 if the signal level exceeds the threshold value. The EXOR circuit 63 has three inputs to receive an output from the buffer 61, an input signal of the output buffer 31 of the positive-phase signal U, and an inverse signal of the input signal of the output buffer 33 of the negative-phase signal /U. The EXOR circuit 63 outputs the exclusive OR to the resister 65. The buffer 62 receives the output signal of the output buffer 33 of the negative-phase signal /U, and outputs the H level to the EXOR circuit 64 when the signal level of the output signal is greater than the threshold value. The EXOR circuit 64 has three inputs to receive the output of the buffer 62, an inverse signal of the input signal of the output buffer 31 of the positive-phase signal U, and the input signal of the output buffer 33 of the negative-phase signal /U. The EXOR circuit 64 outputs the exclusive OR to the register 65. The register 65 stores the signal levels inputted from the EXOR circuits 63 and 64. It is configured so that the signal levels stored by the register 65 can be traced after the fact.

Next, descriptions will be given of the operations of the PWM signal output circuit 60 configured in the above manner. For example, assume that an abnormality occurrence is detected in the AND circuit 51 for detecting the abnormality of the positive-phase signal U of the U phase and then the H level is outputted from the AND circuit 51 to the OR circuit 42, when the positive-phase signal U is to be at the H level and the negative-phase signal /U is to be at the L level. Here, assume that the output of the EXOR circuit 63 stored in the register 65 is at the H level. The output of the EXOR circuit 63 being at the H level indicates that the signals upstream and downstream of the output buffer 31 are both at the H level, and this indicates that the signal level is unchanged upstream and downstream of the output buffer 31. Therefore, it can be understood that the abnormality of the PWM signal detected in the OR circuit 42 originates in an abnormality in the PWM signal outputted from the motor control microcomputer 10. On the other hand, when the output of the EXOR circuit 63 stored in the register 65 is at the L level, one of the input and output sides of the output buffer is at the H level and the other is at the L level. This indicates that the signal level has changed on the input and output sides of the output buffer 31. In other words, it is understood that the abnormality of the PWM signal detected in the OR circuit 42 is one occurred outside the motor control microcomputer 10 (outside the output buffer 31). Note that the V and W phases too have the same configuration, and it is possible to judge whether an abnormality of a PWM signal has occurred inside or outside the motor control microcomputer 10, like the U phase.

As described above, the PWM signal output circuit 60 of the third embodiment is provided with the EXOR circuits 63 and 64 which receive signals of the input and output sides of the output buffer, and the register 65 which stores the outputs of the EXOR circuits 63 and 64. Thereby, upon the occurrence of the abnormality of the PWM signal, it is possible to judge after the fact whether the abnormality has occurred inside or outside the motor control microcomputer 10. Accordingly, it is possible to easily conduct a failure analysis when the PWM signal stops due to the abnormality of the PWM signal.

Fourth Embodiment

Figure 6:
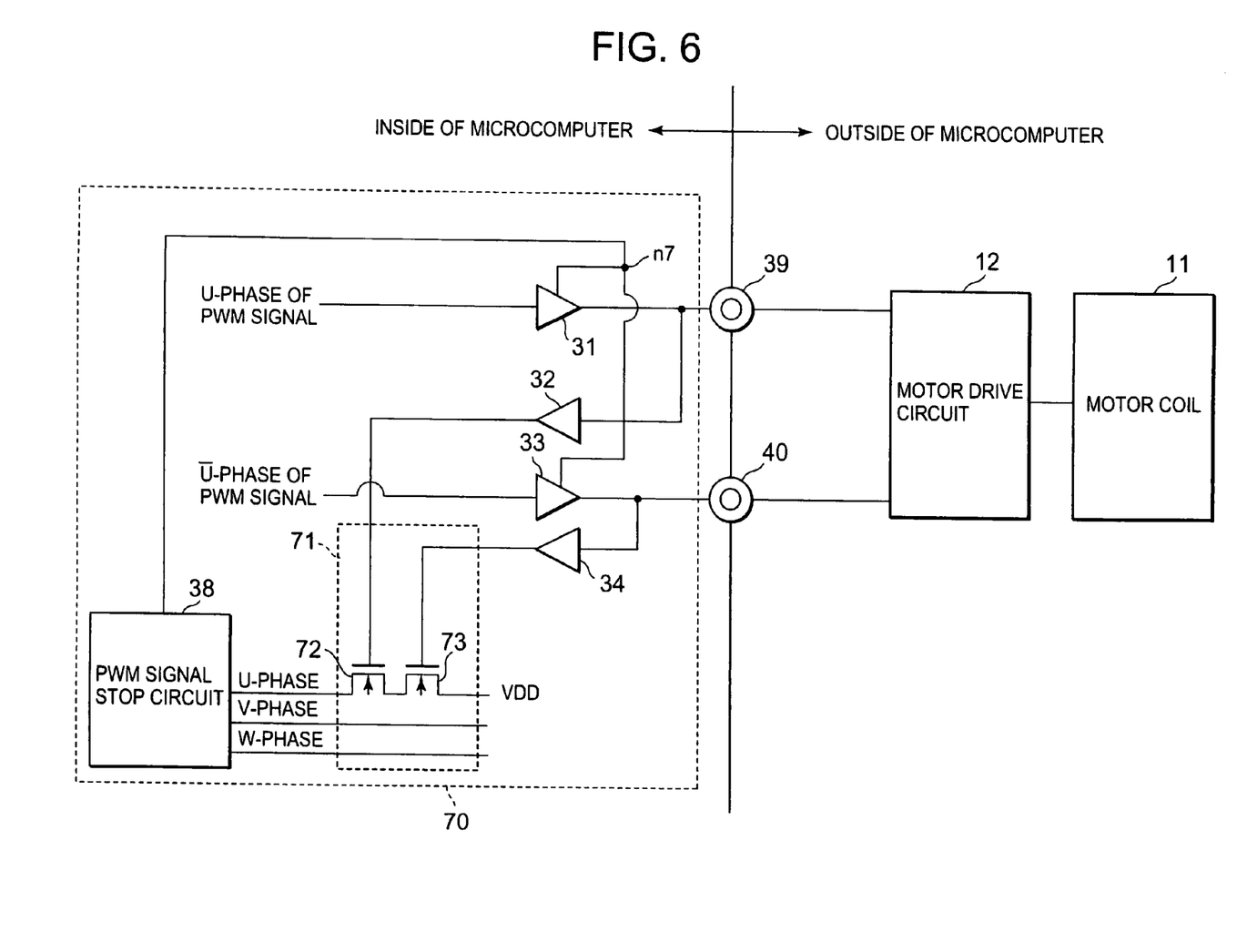
FIG. 6 is a view showing a configuration example of a PWM signal output circuit according to a fourth embodiment of the present invention.

FIG. 6 is a view showing a configuration example of a PWM signal output circuit 70 according to a fourth embodiment of the present invention. The fourth embodiment is characterized in that an abnormal signal detection circuit 71 which detects the H level of the positive- and negative-phase signals is configured of n-type transistors 72 and 73. Although the abnormal signal detection circuits which detect the H level of the positive- and negative-phase signals are configured of the AND circuits in the first to third embodiments, the abnormal signal detection circuit can be configured of another circuit as shown in the fourth embodiment as long as the abnormal signal detection circuit can detect the H level of the positive- and negative-phase signals. Incidentally, although in the abnormal signal detection circuit 71, only the n-type transistors 72 and 73 for detecting U-phase abnormal signals are shown, it is assumed that a pair of n-type transistors is similarly provided for the V and W phases, too.

As shown in FIG. 6, the PWM signal output circuit 70 according to the fourth embodiment is configured to have the n-type transistors 72 and 73. Note that since the other configurations are approximately the same as those in the first embodiment (FIG. 3), the descriptions thereof will be omitted while attaching the same numerical symbols. The n-type transistors 72 and 73 are serially connected. The power VDD is connected to source sides of the n-type transistors 72 and 73, and the PWM signal stop circuit 38 is connected to drain sides thereof. The positive-phase signal U of the U phase is inputted to a gate of the n-type transistor 72, and the negative-phase signal /U of the U phase is inputted to a gate of the n-type transistor 73. In other words, when both of the positive-phase signal U and negative-phase signal /U of the U phase become the H level, both of the n-type transistors 72 and 73 are turned on. Thereby, the abnormal signal detection circuit 71 detects the abnormality of the positive- and negative-phase signals. Note that it is assumed that the V and W phases too similarly have their respective pairs of n-type transistors to which positive- and negative-phase signals are inputted through their respective gates.

In the PWM signal output circuit 70 configured in the above manner, when the abnormality of the PWM signal occurs in which the positive-phase signal U and negative-phase signal /U of the U phase become the H level at the same time, both of the n-type transistors 72 and 73 are turned on. The PWM signal stop circuit 38 judges whether both of the n-type transistors 72 and 73 are on by monitoring the output of the n-type transistor 72, and thereby detects the abnormality of the PWM signal. When both of the n-type transistors 72 and 73 are on, the PWM signal stop circuit 38 detects the abnormality in the U-phase PWM signal and stops the U-, V-, and W-phase PWM signals. Likewise, when the abnormalities of the PWM signals of the V and W phases are detected, the PWM signal stop circuit 38 stops the PWM signals of the three phases.

Although the abnormal signal detection circuit 71 is applied to the PWM signal output circuit of the first embodiment in the fourth embodiment, it is possible to apply the abnormal signal detection circuit 71 to the PWM signal output circuit of the second and third embodiments.

In this manner, the present invention can be embodied by various kinds of circuit configurations as long as the present invention includes: an abnormal signal detection circuit which detects that both of the positive- and negative-phase signals of the PWM signal are at the H level; and the PWM signal stop circuit which stops the PWM signal when the abnormality of the PWM signal is detected by the abnormal signal detection circuit. With such a configuration, the present invention can improve the safety of a motor by instantaneously detecting the abnormality of the motor.

It is apparent that the present invention is not limited to the above embodiments, but may be modified and changed without departing from the scope and sprit of the invention.

What is claimed is:

1. A microcomputer for controlling a motor, comprising:
  a PWM signal output circuit;
  an abnormal signal detection circuit receiving positive-phase and negative-phase signals of the PWM signal, and outputting a detection signal upon the positive-phase and negative-phase signals being a prescribed logical value; and
  a PWM signal stop circuit stopping the PWM signal output circuit from outputting the PWM signal in accordance with the detection signal.

2. The microcomputer according to claim 1, wherein
  the PWM signal output circuit outputs a plurality of PWM signals, each of which comprises a positive-phase signal and a negative-phase signal,
  the abnormal signal detection circuit outputs the detection signal in case both of the positive-phase and negative-phase signals of at least one of the PWM signals are the prescribed logical value, and
  the PWM signal stop circuit stops the PWM signal output circuit from outputting of the plurality of PWM signals in accordance with the detection signal.

3. The microcomputer according to claim 1, wherein the abnormal signal detection circuit outputs the detection signal in accordance with result of logical AND of the positive-phase and negative-phase signals.

4. The microcomputer according to claim 1, wherein
  the abnormal signal detection circuit includes: a positive-phase signal side transistor to which the positive-phase signal is inputted through a gate thereof; and a negative-phase signal side transistor to which the negative-phase signal is inputted through a gate thereof, and
  the abnormal signal detection circuit thus detects, from the conduction statuses of the positive-phase and negative-phase side transistors, that both of the positive- and negative-phase signals have become the prescribed logical value.

5. The microcomputer according to claim 1, further comprising:
  a signal level detection circuit receiving one of the positive-phase and negative-phase signals and outputting a level detection signal, the level detection signal being the prescribed logical value upon the received signal being greater than a threshold value, wherein
  the abnormal signal detection circuit outputs the detection signal in case the other of the positive-phase and negative-phase signals and the level detection signal are the prescribed logical value.

6. The microcomputer according to claim 2, further comprising:
  a signal level detection circuit receiving one of the positive-phase and negative-phase signals of at least one of the PWM signals and outputting a level detection signal, the level detection signal being the prescribed logical value upon a signal level of the received signal being greater than a threshold value, wherein
  the abnormal signal detection circuit outputs the detection signal in case the other of the positive-phase and negative-phase signals and the level detection signal are the prescribed logical value.

7. The microcomputer according to claim 5, wherein
  the threshold value is a quarter voltage of a power supply voltage.

8. The microcomputer according to claims 1, further comprising:
  an output buffer coupled to the PWM signal output circuit to output one of the positive-phase and negative-phase signals to an output terminal of the microcomputer; and
  a register storing a logical value in accordance with a difference between an input value and an output value of the output buffer, wherein
  in response to the logical value stored in the register, the microcomputer judges whether or not a cause of a PWM signal abnormality lies in the microcomputer.

9. The microcomputer according to claim 8, wherein
  the register storing a result value of an exclusive OR operation on the input value and the output value of the output buffer as the logical value.

10. A method of controlling a microcomputer which outputs a plurality of PWM signals for controlling a motor, the method comprising:
  acquiring logic values of positive-phase and negative-phase signals of one of the plurality of PWM signals; and
  stopping the output of the plurality of PWM signals upon the positive-phase and negative-phase signals being a prescribed logical value.

11. The method of controlling a microcomputer according to claim 10, further comprising:
  judging, when one of the positive-phase and negative-phase signals is the prescribed logical value, whether a signal level of the other of the positive-phase and negative-phase signals is greater than a quarter of a power supply voltage, wherein
  the stopping stops the output of the plurality of PWM signals in accordance with a result of the judging.

12. The method of controlling microcomputer according to claim 10, wherein the microcomputer comprises an output buffer to output one of the positive-phase and negative-phase signals to an output terminal of the microcomputer, the method further comprising:
  acquiring a logical value in accordance with a difference between an input value and an output value of the output buffer; and
  judging, in response to the logical value, whether or not a cause PWM signal abnormality lies in the microcomputer.

* * * * *